US009839113B2

(12) United States Patent
Tajima et al.

(10) Patent No.: US 9,839,113 B2
(45) Date of Patent: Dec. 5, 2017

(54) SOLID MEDIA WAKEFIELD ACCELERATORS

(71) Applicant: THE REGENTS OF THE UNIVERSITY OF CALIFORNIA, Oakland, CA (US)

(72) Inventors: Toshiki Tajima, Foothill Ranch, CA (US); Gerard Mourou, Paris (FR)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 430 days.

(21) Appl. No.: 14/658,648

(22) Filed: Mar. 16, 2015

(65) Prior Publication Data

US 2017/0099724 A1 Apr. 6, 2017

Related U.S. Application Data

(60) Provisional application No. 61/954,918, filed on Mar. 18, 2014, provisional application No. 61/953,182, filed on Mar. 14, 2014.

(51) Int. Cl.

| | |
|---|---|
| ***H05G 2/00*** | (2006.01) |
| ***H05H 1/54*** | (2006.01) |
| ***H01S 3/0959*** | (2006.01) |
| ***H05H 7/08*** | (2006.01) |
| ***H05H 15/00*** | (2006.01) |

(52) U.S. Cl.

CPC .............. *H05H 7/08* (2013.01); *H05H 15/00* (2013.01); *H05H 2007/081* (2013.01)

(58) Field of Classification Search

None

See application file for complete search history.

(56) References Cited

PUBLICATIONS

Chen, P., et al., "Acceleration of Electrons by the Interaction of a Bunched Electron Beam with a Plasma", Phys. Rev. Lett., 1985, vol. 54, No. 7, pp. 693-696.
Corde, S., et al., "Femtosecond x rays from laser-plasma accelerators", Rev. Mod. Phys., 2013, vol. 85, No. 1, pp. 1-48.
Deng, A., et al., "Electron beam dynamics and self-cooling up to PeV level due to betatron radiation in plasma-based accelerators", Phys. Rev. Special Topics—Accel. and Beams, 2012, vol. 15, pp. 081303-1-081303-15.
Di Piazza, A., et al., "Extremely high-intensity laser interactions with fundamental quantum systems", Rev. Mod. Phys., 2012, vol. 84, No. 3, pp. 1177-1228.
Esarey, E., et al., "Physics of laser-driven plasma-based electron accelerators", Rev. Mod. Phys., 2009, vol. 81, No. 3, pp. 1229-1285.
Esirkepov, T., et al., "Highly Efficient Relativistic-Ion Generation in the Laser-Piston Regime", Phys. Rev. Lett., 2004, vol. 92, No. 17, pp. 175003-1-175003-4.
Ijima, S., "Helical microtubules of graphitic carbon", Letters to Nature, 1991, vol. 354, pp. 56-58.
Koga, J., et al., "Electron acceleration under strong radiation damping", Ultrafast Optics V, 2007, vol. 132, No. 5, pp. 1-6.
The Livingston chart, Handbook of Accelerator Physics and Engineering, edited by A. Chao, 1999, p. 29.

(Continued)

*Primary Examiner* — Dedei K Hammond
(74) *Attorney, Agent, or Firm* — One LLP

(57) ABSTRACT

Systems and methods for that utilize a compressed coherent high intensity X-ray pulse to drive acceleration of particles in a solid medium laser wakefield accelerator (LWFA).

23 Claims, 6 Drawing Sheets

(56) References Cited

PUBLICATIONS

Ma, Y., et al., "Diagnosis of bubble evolution in laser-wakefield acceleration via angular distributions of betatron x-rays", Appl. Phys. Lett., 2014, vol. 105, pp. 161110-1-161110-4.
Miyadera, H., et al., "Noninvasive Reactor Imaging Using Cosmic-Ray Muons", Proceedings of the International Symposium on Nuclear Physics and Gamma-Ray Sources for Nuclear Security and Nonproliferation, edited by Takehito Hayakawa, et al., 2014, pp. 177-186.
Mourou, G. A., et al., "Optics in the relativistic regime", Rev. Mod. Phys., 2006, vol. 78, No. 2, pp. 309-371.
Mourou, G.., et al., "Single cycle thin film compressor opening the door to Zeptosecond-Exawatt physics", Eur. Phys. J. Special Topics, 2014, vol. 223, pp. 1181-1188.
Myung, N. V., et al., "Alumina nanotemplate fabrication on silicon substrate", Nanotechnology, 2004, vol. 15, pp. 833-838.
Nakajima, K., et al., "Operating plasma density issues on large-scale laser-plasma accelerators toward high-energy frontier", Phys. Rev, Special Topics—Accel. and Beams, 2011, vol. 14, pp. 091301-1-091301-12.
Naumova, N. M., et al., "Relativistic Generation of Isolated Attosecond Pulses in a $\lambda^3$ Focal Volume", Phys. Rev. Lett., 2004, vol. 92, No. 6, pp. 063902-1-063902-4.
Newberger, B., et al., "Application of Novel Material in Crystal Accelerator Concepts", IEEE Particle Accelerator Conference, 1989, pp. 630-632.
Strickland, D., et al., "Compression of Amplified Chirped Optical Pulses", Optics Communications, 1985, vol. 56, No. 3, pp. 219-221.
Tajima, T., et al., "Laser Electron Accelerator", Phys. Rev. Lett., 1979, vol. 43, No. 4, pp. 267-270.
Tajima, T., "High energy laser plasma accelerators", Laser and Particle Beams, vol. 3, No. 4, 1985, pp. 351-413.
Tajima, T., et al., "Crystal X-Ray Accelerator", Phys. Rev. Lett., 1987, vol. 59, No. 13, pp. 1440-1443.
Tajima, T., et al., "Laser Interaction with Neutrons", J. Phys. Soc. Jpn., 2000, vol. 69, No. 12, pp. 3840-3846.
Tajima, T., "Laser acceleration and its future", Proc. Jpn. Acad., Ser. B, 2010, vol. 86, No. 3, pp. 147-157.
Tajima, T., "Laser acceleration in novel media", Eur. Phys. J. Special Topics, 2014, vol. 223, pp. 1037-1044.
Terranova, F., et al., "Laser-driven proton sources: technological challenges and applications to neutrino physics", Nuclear Physics B, Proc. Suppl., 2005, vol. 143, p. 572.
Zheng, F. L., et al., "Sub-TeV proton beam generation by ultra-intense laser irradiation of foil-and-gas target", Physics of Plasmas, 2012, vol. 19, pp. 023111-1-023111-5.
Zheng, F. L., et al., "Laser-driven collimated tens-GeV monoenergetic protons from mass-limited target plus preformed channel", Physics of Plasmas, 2013, vol. 20, pp. 013107-1-013107-7.

10

SOLID MEDIA WAKEFIELD ACCELERATORS

CROSS-REFERENCE TO RELATED APPLICATIONS

The application claims the benefit of U.S. provisional patent application No. 61/953,182, filed on Mar. 14, 2014, and U.S. provisional patent application Ser. No. 14/954,918, filed on Mar. 18, 2014, which applications are incorporated herein by reference.

FIELD

The embodiments described herein relate generally to accelerators and, more particularly, to systems and methods that facilitate high energy acceleration within wakefield accelerator in the solid media regime.

BACKGROUND INFORMATION

Contemporary accelerator technology is based on radio frequency (rf) electromagnetic waves in vacuum tubes [ref. 1, Livingston]. This technology served well for high energy physics as well as other applications such as medical therapy machines for several decades. However, in recent decades it has become apparent that the so-called Livingston chart, in which the accelerator energies exponentially increase over time (just like Moore's law in the semiconductor chip capabilities) [ref. 1], tends to show slower growth (and even saturation tendency). This is due to the accelerating gradient in rf accelerators having a limit beyond which the metallic surface of the rf tube begins to spark and the metal breaks down to create plasma inside the vacuum tube. A typical limit for such an accelerating gradient is about 100 MeV/m.

A laser wakefield accelerator (LWFA) [ref. 2] and its derivatives, such as plasma wakefield accelerators [ref. 2a], use the broken-down gas, plasma, as the medium of acceleration. Thus, the LWFA cannot further break down and has an accelerating gradient far greater than conventional rf accelerators. The typical accelerating gradient of an LWFA is about 100 GeV/m (and other plasma wakefield accelerators are about 1-10 GeV/m), which is about four orders of magnitude greater than the existing rf accelerators.

With the advent of new laser technology called the Chirped Pulse Amplification (CPA) [ref. 3], the accelerating gradient of LWFAs has been scientifically verified many times over [ref. 4]. As predicted, a typical acceleration gradient of 100 GeV/m and a typical energy gain of 1 GeV over a few cm have been observed. The theoretical energy gain is also seen to scale with the inverse of the density of the acceleration medium. The decrease of the plasma density needs to be accompanied by the increase of the laser energy. Thus, in order to increase the gained energy in LWFAs from GeV to 100 GeV, the laser energy needs to increase from J to 100-1000 J class.

Thus, it is desirable to provide systems and methods that facilitate high energy acceleration in wakefield accelerators.

SUMMARY

The embodiments described herein are directed to or include that facilitate wakefield accelerations where the media of acceleration includes solid materials with one or more nanoholes, such as, e.g., a crystal with nanoholes, carbon nanotubes, porous nanomaterials, etc., that may be prepared by various techniques including nanotechnology [e.g., ref. 5b, ref. 5c]. While the solid material sustains the intense wakefields, the porosity with aligned holes facilitate the propagation through the solid material of accelerated particles such as electrons, protons, ions, etc., while reducing collisions with the solid material's electrons.

The embodiments described herein are directed to or include systems and methods that utilize a compressed coherent high intensity X-ray pulse to drive the acceleration of particles in a laser wakefield accelerator (LWFA). The compressed high intensity X-ray pulse facilitates high energy acceleration within LWFAs. By utilizing the compressed high intensity X-ray pulse, the [ref. 5] LWFA is operable within the solid material regime, such as, e.g., a crystal with nanoholes, carbon nanotubes, porous nanomaterials, etc., rather than gas[ref. 5a]

The embodiments described herein take advantage of new developments in the laser pulse compression technology into the regime of femtoseconds (fs) pulse duration (single oscillation in the pulse) combined with high power [see, e.g., ref. 5]. With the new laser compression technology, laser pulses with high power on the order of PW-100 PW with a (single oscillation) fs pulse duration are producible. By using the available compact intense laser technology, a coherent X-ray pulse can produced that is compressed from a femtosecond (fs) intense laser. Such a compressed coherent X-ray pulse can be well into hard X-ray regimes such as, e.g., 10 keV, with the power of up to as much as 10 EW. For example, the compression technology is capable of turning an optical laser (e.g., 100 PW with 200 J 2 fs laser) into a coherent X-rays of, e.g., 10 keV photons with a single oscillation period less than 2 attosecond (as) in, e.g., 10 EW with about 20 J X-rays.

Such X-rays may be focusable far beyond the diffractive limit of the focal size down to the laser wavelength. When such X-rays, e.g., a zeptosecond (or attosecond) X-ray pulse with up to EW power are injected into a crystal (such as a metallic electron plasma), laser wakefield acceleration occurs in the metallic electron plasma. If the X-ray field is limited by the Schwinger field, the achievable energy is about 1 PeV over 50 m with the focal size of 100 nm. If the focal size is allowed to scale down beyond this value (with the electric field even exceeding the Schwinger field with a single, nearly 1D plane wave geometry), the acceleration energy gain could be even larger.

With such X-rays, not only is LWFA electron acceleration possible, once ions are pre-accelerated beyond GeV, the pre-accelerated ions are capable of being accelerated in a LWFA to similar energies over similar distances. Such high energy proton (and ion) beams can induce copious neutrons, which can also give rise to intense compact muon beams and neutrino beams. These beams may be portable. Very efficient and high-energy gamma rays can also be emitted by this accelerating process, both by the betatron radiation as well as by the radiative-damping dominant dynamics with the brilliance many orders of magnitude over the brightest X-rays sources over a very compact size.

In other embodiments, the wakefield accelerator within the solid material regime may be driven by electron beams, proton beams, etc.

In still other embodiments, a compressed coherent high intensity X-ray pulse to drive acceleration of particles in a non-linear QED vacuum. The compressed high intensity X-ray pulse facilitates self-organized vacuum fiber acceleration. By utilizing the compressed coherent high intensity X-ray pulse, enables high energy acceleration absent an acceleration medium and absent surrounding material.

Other systems, methods, features and advantages of the example embodiments will be or will become apparent to one with skill in the art upon examination of the following figures and detailed description.

BRIEF DESCRIPTION OF THE FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Figure 1:
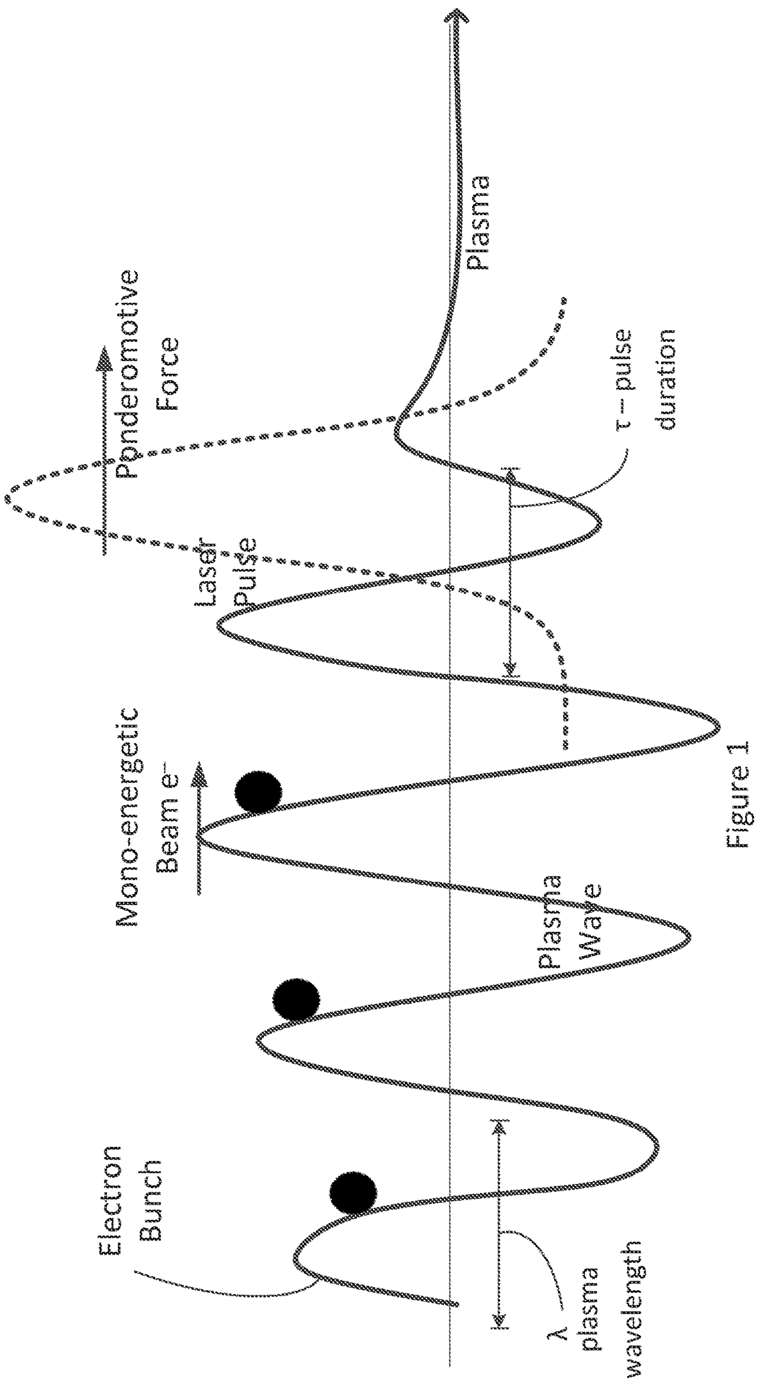
FIG. 1 illustrates the accelerator mechanism of a conventional laser wakefield accelerator (LWFA), which utilizes the high-power electromagnetic radiation from a laser to accelerate electrons to high energies in a short distance.

Each of the additional features and teachings disclosed below can be utilized separately or in conjunction with other features and teachings to produce systems and methods that facilitate high energy acceleration in wakefield accelerators in the solid media regime and systems and methods that utilize a compressed coherent high intensity X-ray pulse to drive acceleration of particles in a laser wakefield accelerator (LWFA). Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detailed description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

The embodiments described herein are directed to or include that facilitate wakefield accelerations where the media of acceleration includes solid materials with one or more nanoholes, such as, e.g., a crystal with nanoholes, carbon nanotubes, porous nanomaterials, etc., that may be prepared by various techniques including nanotechnology [e.g., ref. 5b, ref. 5c]. While the solid material sustains the intense wakefields, the porosity with aligned holes facilitate the propagation through the solid material of accelerated particles such as electrons, protons, ions, etc., while reducing collisions with the solid material's electrons.

The embodiments described herein are directed to or include systems and methods that utilize a compressed coherent high intensity X-ray pulse to drive the acceleration of particles in a laser wakefield accelerator (LWFA). The compressed high intensity X-ray pulse facilitates high energy acceleration within LWFAs. By utilizing the compressed high intensity X-ray pulse, the [ref. 5] LWFA is operable within the solid material regime, such as, e.g., a crystal with nanoholes, carbon nanotubes, porous nanomaterials, etc., rather than gas [ref. 5a]

In other embodiments, the wakefield accelerator within the solid material regime may be driven by electron beams, proton beams, etc.

Figure 2:
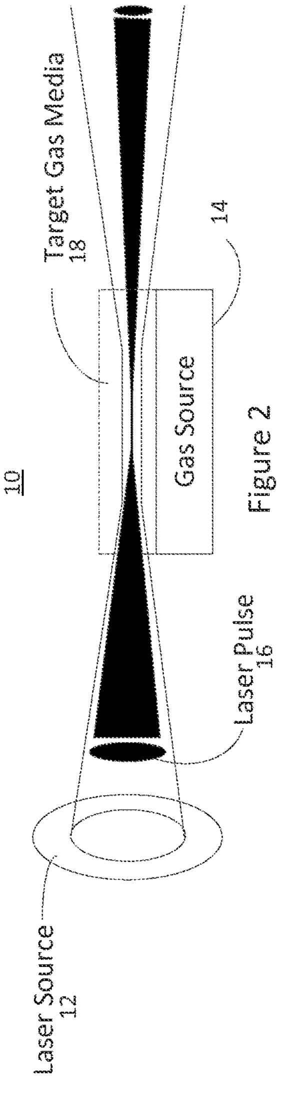
FIG. 2 is a schematic of a conventional LWFA.

A conventional LWFA 10 is shown in FIG. 2 to include, among other components, a gas source 14 to produce a target gas medium and a laser source 12 to inject a laser pulse 16 into the target gas medium 18. FIG. 1 illustrates the accelerator mechanism of a conventional LWFA, which utilizes the high-power electromagnetic radiation from a laser to accelerate electrons to high energies over a short distance in a gaseous plasma. [see, e.g., ref. 2]

Figure 3:
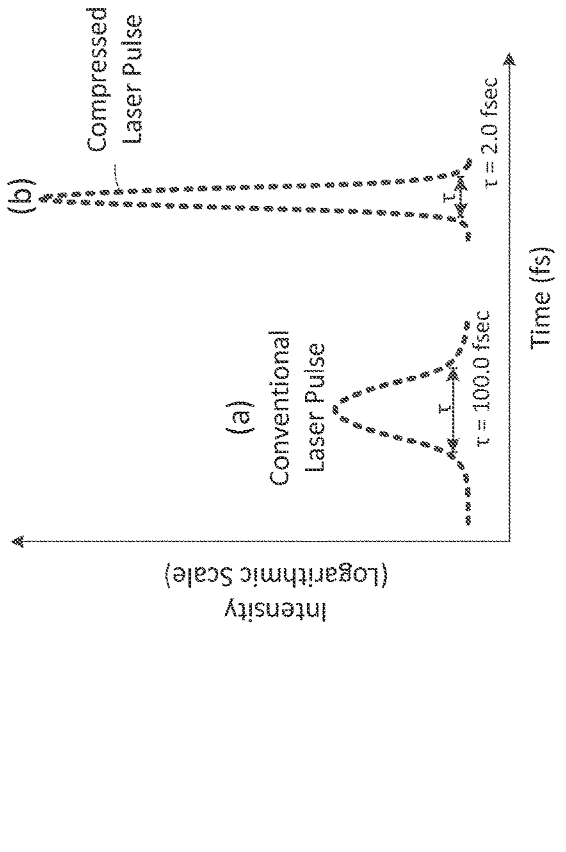
FIG. 3 illustrates the pulse duration and intensity of (a) a conventional approximately 100 fs optical laser pulse compared to (b) a compressed fs optical laser pulse.

The embodiments described herein, however, take advantage of new developments [ref. 5] in laser pulse compression technology which enables the compression of a laser pulse into the regime of fs pulse duration (single oscillation in the pulse) combined with high power [see, e.g., ref. 5]. With the new laser compression technology, laser pulses with high power on the order of 1.0 PW-100 PW with a (single oscillation) fs pulse duration are producible. The pulse duration and intensity of (a) a conventional approximately 100 fs optical laser pulse compared to (b) a compressed fs optical laser pulse is shown in FIG. 3 [ref. 5].

By using the available compact intense laser technology, a coherent X-ray pulse can be produced that is compressed from an intense fs laser. Such a compressed coherent X-ray pulse can be well into hard X-ray regimes such as, e.g., 10 keV, with the power of up to as much as 10 EW. For example, the compression technology is capable of turning an optical laser (e.g., 100 PW with 200 J 2 fs laser) into a coherent X-rays of, e.g., 10 keV photons with a single oscillation period less than 2 attosecond (as) in, e.g., 10 EW with about 20 J X-rays.

LWFA in Porous Nanomaterials

In the following embodiments, the high frequency of photons is taken advantage of in order to drive wakefields in high density matter. In an LWFA, the higher the density of the medium (plasma), the greater the acceleration gradient. However, the higher the density of the plasma for the fixed frequency of the laser, the lower the energy gain by LWFA [ref. 2]. The high intensity LWFA energy gain is given by $$\epsilon e = a_0^2 mc^2 (n_c/n_e), \quad (1)$$

where $a_0$ is the normalized vector potential of the laser electric field, $n_c$ is the critical density of the plasma at the laser frequency, $n_e$ the electron density of the plasma [ref. 6].

Equation (1) indicates that an increase in the critical density can help avoid the lowering of energy gain by increasing the density of the plasma. For 1 eV optical photons, $n_c$ is about $10^{21}$/cc, while for photons of 10 keV X-rays, $n_c$ is about $10^{29}$/cc. Thus the use of Xrays as the driver in an LWFA introduces tremendous energy multiplication according to Equation (1). As a result, as shown below, the use of solid density electrons is possible in an LWFA. The typical solid density of electrons is $10^{23}$/cc.

The accelerating length $L_{acc}$ of a solid regime LWFA using high energy X-rays [ref. 5] is defined as $$L_{acc} \sim a_X (C/\omega_p)(\omega_X/\omega_p)^2, \quad (2)$$

where $\omega_X$ is the X-ray frequency, $\omega_p$ is the plasma frequency of the solid seen by the X-ray photons (which depends on the photon frequency how deep the bind electrons may be regarded as the 'plasma electrons' for the X-ray photons). Here $a_X$ is the normalized vector potential of the X-rays, corresponding to the optical laser's $a_0$. The crystal LWFA energy gain is thus $$\epsilon_X = a_X^2 mc^2 (n_c/n_e), \quad (3)$$

if the X-rays are not focused below the radius of the optical laser focal size, $a_X \sim a_0\ (\omega_0/\omega_X)$, where $\omega_0$ is the optical photon frequency. However, as the diffraction limit of the X-ray focal size can be as small as the X-ray wavelength (which is possible in principle), the value of maximum possible $a_X$ is not so small as the above value of $a_X \sim a_0$ $(\omega_0/\omega_X)$, but the reduction of $a_X$ $a_X$ is by the factor of $(\omega_0/\omega_X)$ from $a_0$, but remains as $a_X \sim a_0$ in the extreme optimal case of X-ray focus. If the focal size of the X-rays between these two extremes (1μ and 0.1 nm) is taken as an example, i.e., a focal size of 100 nm, the focal intensity of the X-rays is approximately at the Schwinger intensity, if the X-rays are generated by the mechanism of Naumova et al. [ref. 7].

Figure 4:
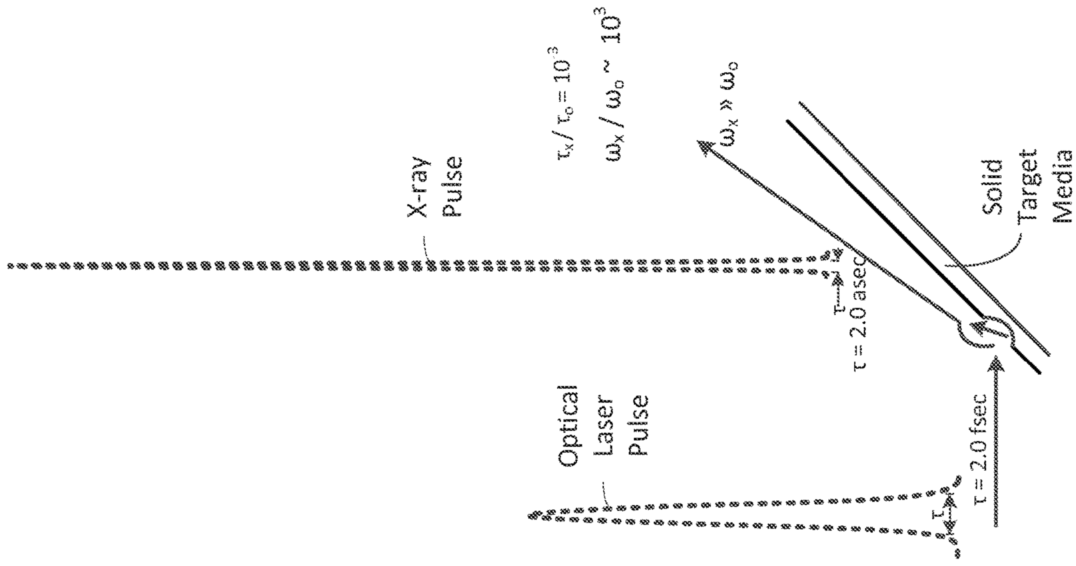
FIG. 4 illustrates the Naumova's mechanism in a compressed X-ray pulse generator.

As an X-ray pulse generator in FIG. 4 shows, the Naumova's mechanism makes the optical laser interact severely with the surface of a solid target medium, which causes pulse compression. This results in the compression of the single oscillating laser pulse reflected off with a pulse of single oscillation higher frequency coherent photons. Here the pulse length is given as $$\tau_X \sim 600/a_0, \quad (4)$$

where $\tau_X$ is given in the unit of attosecond (as) [ref. 7]. In other words, the X-ray pulse power goes up by this compression of X-rays by a factor of approximately $a_0^2$ over that of the original optical laser power divided by the conversion efficiency about 0.1. As a result, the original nearly 200 J optical laser at 2 fs now becomes a coherent X-ray laser at 10 EW and at less than 2 as pulse duration. In this example, the energy gain by the LWFA mechanism in the solid crystal with electronic density of $10^{23}$/cc (that is the density seen by the X-rays at 10 keV) is from Eq. (3) as $\epsilon_X \sim 1$ PeV and $L_{acc} \sim 50$ m.

Figure 5:
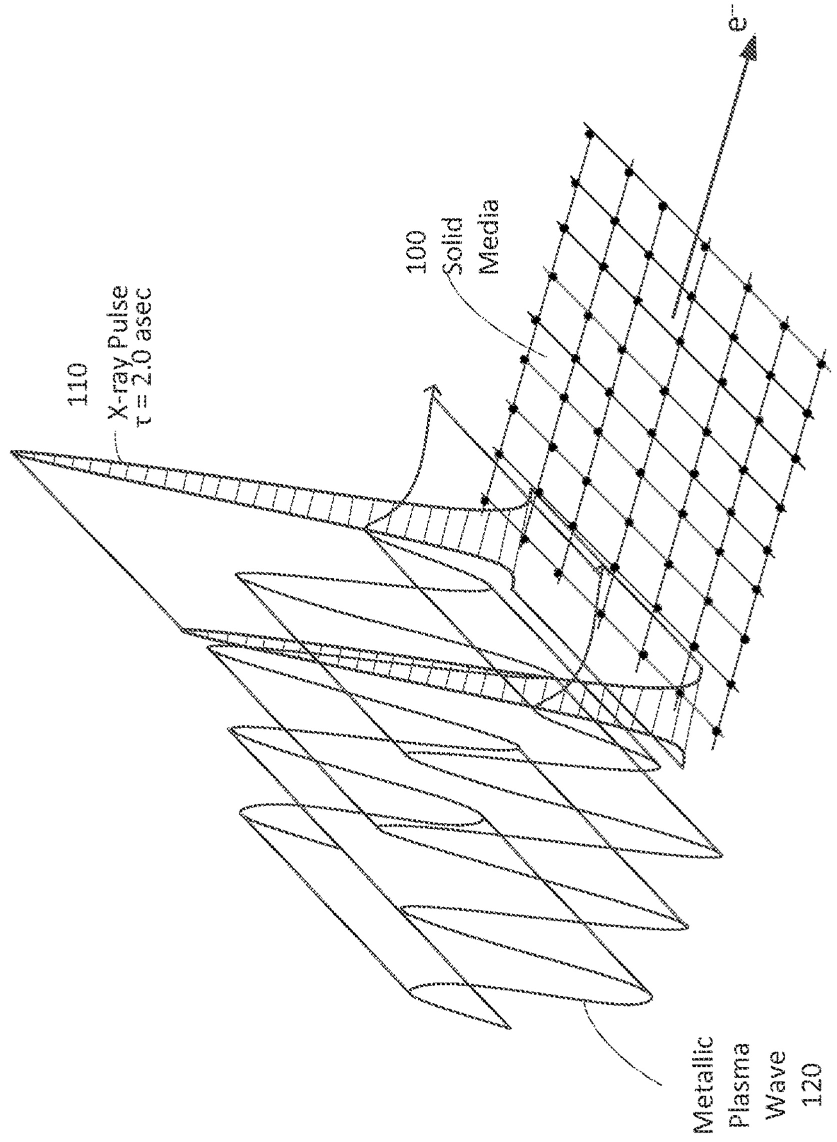
FIG. 5 illustrates laser wakefield acceleration in a crystal using a compressed X-ray pulse.

FIG. 5 illustrates the LWFA acceleration mechanism in a solid media, such as, e.g., crystal, carbon nanotubes, nanoporous material, etc., with a high intensity coherent X-ray pulse. Here it is assumed that electron energy loss by various mechanisms including Bremsstrahlung and betatron radiation by electrons can be negligible. In reality these radiations become very important [refs. 8 and 9]. In addition, a host of other quantum mechanical processes become important, such as the pair creation. However, it is known that the betatron radiation can contribute to the cooling of the transverse emittance and helps to potentially enhance the luminosity [ref. 9].

Figure 6:
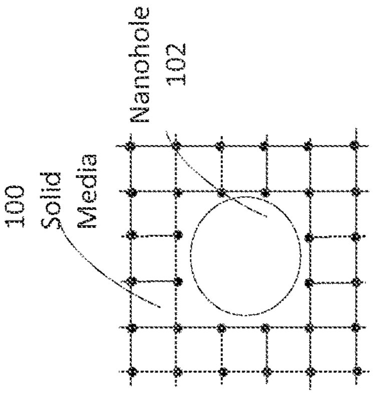
FIG. 6 illustrates a nanohole formed in a crystal.

In order to overcome potentially large electron (and positron) energy loss in the solid media, one or more nanoholes (or an even narrower tube as narrow as an Angstrom), as shown in FIG. 6, can be provided in the solid media through which transmission of electrons and positrons is conducted, while the X-rays, as in the above example indicated, propagate over a wider radial cross section, such as, e.g., typically 100 nm. However, if X-rays can be focused onto an even smaller radius, the corresponding value of $a_X$ becomes greater than the value used in the above estimate of $a_X \sim 30$ and thus the value of the gained energy and accelerating distance in Eqs. (3) and (2) become much greater than the values estimated above.

Figure 7:
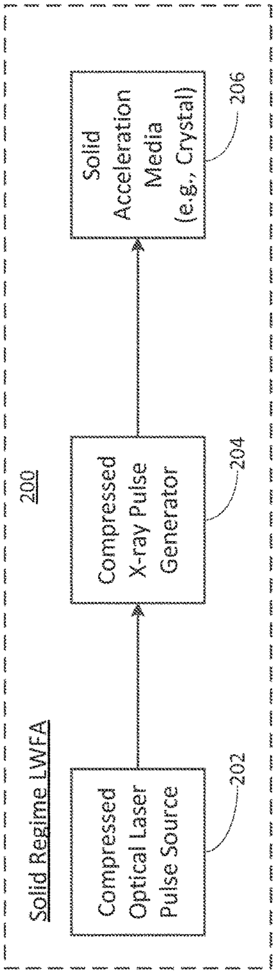
FIG. 7 is a schematic of a solid regime LWFA.

FIG. 7 shows a solid regime LWFA 200 comprising a compressed optical laser pulse source 202, a compressed X-ray pulse generator 204 coupled to the laser pulse source 202 and configured to generate a high power compressed X-ray pulse, and a solid acceleration media, such as, e.g., crystal, carbon nanotubes, nanoporous material, etc.

Figure 8:
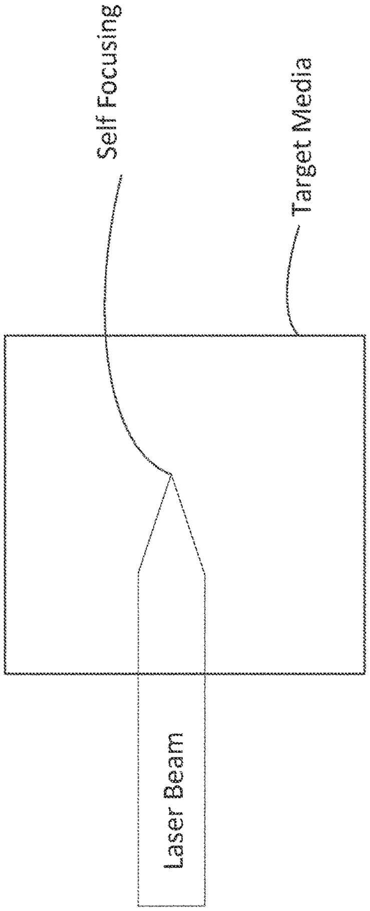
FIG. 8 illustrates self-focusing of a laser beam in a target media.

It is noted that it may be argued that at the Schwinger intensity (or even below that value) of the X-ray (or optical) lasers, the pair creation process becomes so dominant that no field intensity above this value may be realizable. If this is the case, the enhanced energy gain beyond the value estimated above may not be surpassed. However, this seeming ultimate limit of the laser field intensity at the Schwinger value may be lifted because the Poincare invariants $E^2-B^2$ and E B remain Lorentz invariant if there is only one EM wave in a plane 1D geometry, such a wave cannot break down the vacuum. Thus it may be possible to conduct the transmission above the Schwinger value without much breakdown of vacuum if the above condition (or approximately that condition) is satisfied. The estimate mentioned above for 100 nm focus, for example, may allow near 1D geometry so that the case in study may be close to such situation. If so, the field above that is attainable, at least theoretically. Here the self-focusing condition in vacuum (for example, see ref. 11) is fulfilled if the power of the laser P exceeds the critical power defined by $$P_{cr} = (90/28) c E_S^2 \lambda^2 \alpha^{-1}, \quad (5)$$

where $E_S = 2\pi\ m^2c^3/e\ h$ is the Schwinger field and $\alpha$ is the fine structure constant. This value is as high as a few times $10^{24}$ W for optical lasers. However, for 10 keV X-rays, it is merely 25 PW because of the square dependence of the wavelength of the driver in Eq. (5). Thus it is possible to realize the self-focus (FIG. 8) of the above described X-ray laser pulse. This could further enhance the parameters estimated above.

Under this regime of X-ray intensity it's also possible to accelerate particles (electrons etc.) in vacuum. The longitudinal field component is generated by modulation of the intense X-rays that enters the nonlinear QED vacuum condition. The self-modulation generates the possibility of not only the accelerating longitudinal field, but also the condition to make its phase velocity equal to c. This is determined by the following conditions. Once this self-focus, diffraction, and defocus process would ensue, the local phase velocity of this X-ray laser $\omega/k_z$ is generally greater than c. Here the dispersion relation of the laser is determined as $$\omega=c\sqrt{(k_z^2+\langle k_{perp}^2\rangle)}, \quad (6)$$

where $\langle k_{perp}^2\rangle$ is the average of the square of the perpendicular wavenumber $k_{perp}$ that changes as the laser propagation undergoes the above process of self-focus and diffraction. In order to match the phase velocity of the accelerating structure with the particle velocity (c), a slow wave structure with the slow wave corrugation wavenumber $k_s$ is introduced and satisfies the condition [ref. 9a]:

$$\omega/(k_z+k_s)=c, k_s=2\pi/s. \quad (7)$$

The length s is determined by the repeated succession of self-focusing and diffraction, which produces the periodicity of this repetition. The exact condition to choose the entrant X-ray laser focusing for satisfying Eq. (7) may need to be determined by numerical QED simulation, etc. Under this condition of intense X-rays, no medium is needed.

Figure 10:
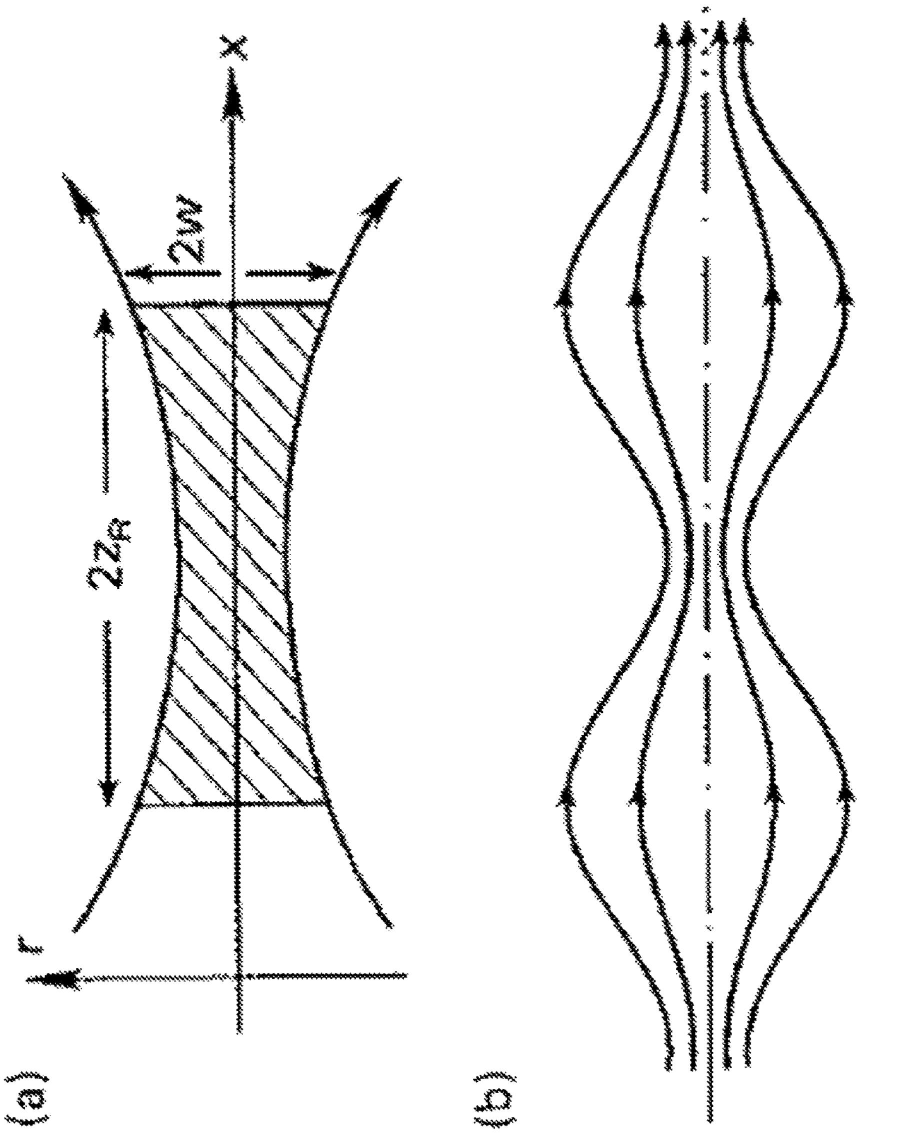
FIG. 10 is a schematic of a Schwinger fiber accelerator.

As shown in FIG. 10, a Schwinger fiber accelerator (SFA) comprises a compressed optical laser pulse source, a compressed X-ray pulse generator connected to the laser pulse source and configured to generate a high power compressed X-ray pulse, and a non-linear QED vacuum.

Figure 9:
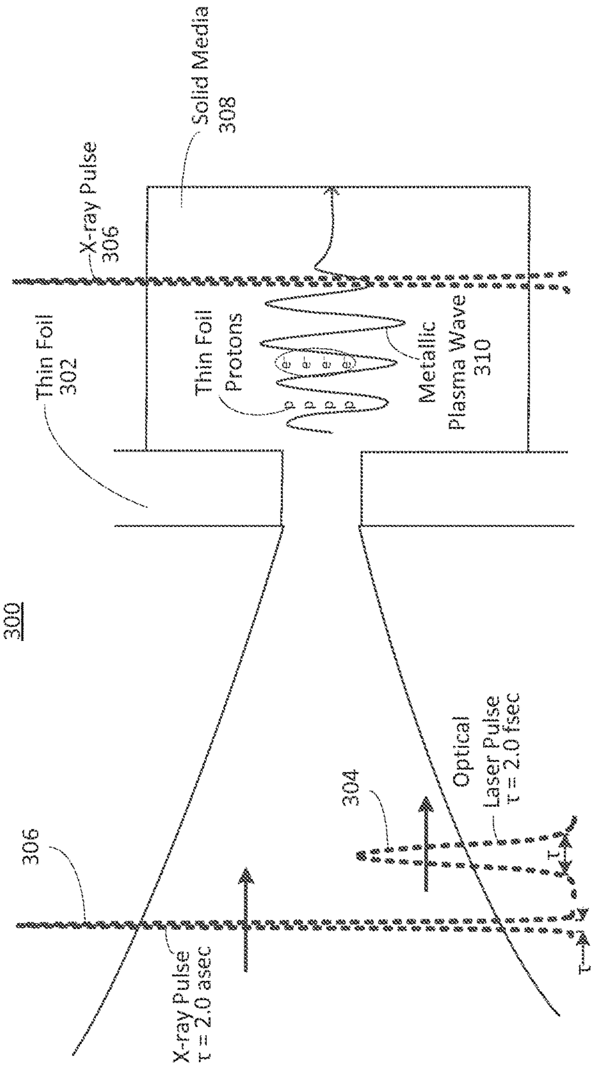
FIG. 9 is a schematic of a solid regime laser wakefield proton accelator.

Ultracompact High Energy Proton and Ion Acceleration in LWFA in a NanoPorous Material The crystal X-ray LWFA configuration for the acceleration of electrons (and positrons), may be applied to proton acceleration. FIG. 9 illustrates a specific example of the method introduced by Zheng et al. [ref. 12]. This is a two-step LWFA method 300 assisted by a radiation pressure driven injector. In this scheme, a first thin solid foil 302 functions as an ion injector for a radiation pressure acceleration process [ref. 13]. The ion injection process may be driven either by the compressed optical pulse 304 or the subsequently compressed X-rays pulse 306. This is because in the case of the usage of a 10 PW optical laser at 20 fs allows access to the value of $a_0$ in excess of the mass ratio of proton-to-electron M/m, so that the optically compressed pulse at 2 fs is sufficient to accelerate protons (and ions) immediately relativistic regime that makes proton acceleration similar to electron acceleration at the entry of the relativistic optics of $10^{18}$ W/cm$^2$. Once protons p (or ions) are injected from the thin foil 302 with relativistic energy into the solid acceleration media 308, the protons (ions) are accelerated with laser wakefield acceleration similarly to electrons e as described above. The formulas of Equations (3) and (2) for the energy gain and the acceleration length apply equally well suited for ion acceleration (the energy gain of ions is the charge of ions Q times that of electrons).

The radiativeness of protons and ions is far smaller than electrons (mostly negligible in the parameters of relevance). Thus this process for ions and its corresponding formulas Equations (3) and (2) discussed above without radiative effects, should be more reliable than that for the electron case. This opens up an entirely new prospect to consider proton or ion linear accelerators and colliders. For such a new process, the luminosity issue needs to be considered without the allowance of ring accumulation that is typical of hadron colliders. On the other hand, this allows a compact linear accelerator for protons and ions for lower energy applications. These include the following applications discussed below.

Ulracompact Neutron Source

It is possible to achieve relativistic protons or ions without the second step of the above two step ion acceleration approach, as the laser intensity is so high at the compressed optical laser before resorting to the X-ray compression step. Using the radiation pressure acceleration scheme of Ref. 13, relativistic protons (and ions) are accessible without resorting to the crystal X-ray acceleration step. This allows the production of relativistic neutrons primarily propagating in the forward direction with a narrow spreading angle. The distance over which such neutrons are produced can be less than mm with the kind of laser intensity mentioned.

Ultracompact Muon and Neutrino Sources and Muon Linear Collider

With access to highly relativistic neutrons in an instantaneous fashion over extremely short distance, relativistic neutrons can be used to make relativistic muon beams and neutrino beams in the fashion as described in Ref. 14. The relativistic muon beams thus generated may be injected into the above crystal LWFA accelerator. Thus muons are accelerated in this crystal LWFA to extreme high energies in a linear fashion. The energy gain and the acceleration length are substantially the same as in the Equations (3) and (2) for muons. However, one important difference is that muon being nearly 200 times heavier than electrons and, as a result, the radiative energy loss of muons are many orders of magnitude less than that of electrons. Because muons are as simple fundamental particles as electrons, the resultant muon linear collider may be as fantastic (or more so) as the electron-positron collider at the same energy. The described muon liner collider does not suffer from the radiative activation of the surrounding walls of the circular muon ring that prepare for the collision events, because the main radiative activation happens from muon decay in the direction of the tangent of the muon orbit (in the circular geometry). The linear muon accelerator provided here creates only the muon decay and thus the radiative activation in the muon propagation direction, which can be limited only on that small stellardian.

Both the muon beams and neutron beams emanating from this scheme can be produced in a laser that can fit (in principle) to a portable size. This is because the laser system is portable. The accelerating distance is even more modest than the size of the laser. Since the muon source and neutrino source can be portable, the muon beam may be utilized to diagnose dense materials (for example, the radioactive exposed radioactive spent fuel such as the Fukushima) and its constituent isotopes etc. [ref. 15]. The interaction length of high energy muon beams is intermediate. That is much longer than that of electrons, so that it is sufficiently far removed from some short distance inconvenience such as the imminent radiative threat like Fukushima. On the other hand, it is not a macroscopic distance to be unrealistic.

The neutrino interaction length is macroscopic, i.e., the length is as long as several thousand km even with the matter as dense as the earth's interior. As a result, neutrino beams can be adopted as the probe of the earth's interior. A portable neutrino source would a CT scan of the earth's interior, both the crust and the deep interior. The former would bring unprecedented global information of the geology of minerals, water, and other deposits (such as oil and gas), as well as the earth geologic structure (such as the seismological information). The deep interior structure obtainable from neutrino will assist our understanding of the planetary genesis and evolution as well as precise knowledge of the interior materials.

Ultraintense and Ultrahigh Energy Gamma Beam Sources

Both the intense laser of the compressed optical pulse as well as the highly accelerated electrons in the crystal by the derived X-rays are capable of generating bright and some-times even coherent high energy photons from the original optical pulses via various processes. First, the radiative damping effects are expected to become important beyond the laser intensity of $10^{23}$ W/cm$^2$ [refs. 16, 17]. Beyond this threshold a highly efficient gamma ray generation is expected from the electrons directly from the radiative damping processes. In addition to this, a very efficacious radiative process via the betatron radiation in the LWFA is known [refs. 8, 9, 18, 19]. Ref. 19 shows that LWFA driven betatron radiation can exceed the third-generation large synchrotron radiation facilities in their instantaneous brilliance by a large margin.

Neutron Manipulation by Intense Lasers

The ultraintense optical laser permits the exploration of the interaction with neutrons. Neutrons are charge neutral. This may be regarded as not possible to make interaction with lasers. However, neutrons do have a tiny but finite magnetic moment. Latching onto this magnetic moment of neutrons, it becomes possible to kick the neutrons by lasers. The intensity of the compressed optical laser, i.e., beyond $10^{25}$ W/cm$^2$, is enough that it begins influencing the dynamics of even chargeless neutrons. A neutron's tiny but finite magnetic moment can interact with a magnetic field gradient with sufficiently strong EM intensity at or beyond $10^{25}$ W/cm$^2$ [ref. 20]. As a result, a concrete way is now provided to manipulate cold neutrons (typical energy $3\times10^{-3}$ eV) with a beat wave of two intense lasers at intensity of $10^{25}$ W/cm$^2$ realizable by the optical laser compressed into a 2 fs laser by the method of ref. 3.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

The following list of references are incorporated herein by reference:

Ref. 1: M. Livingston et al., Particle Accelerators (McGraw-Hill, New York, 1962; A. Chao et al., Handbook of Accelerator Science and Technology (World Scientific, Singapore, 1999).
Ref. 2: T. Tajima et al., Phys. Rev. Lett. 43, 267 (1979).
Ref. 2a: P. S. Chen, et al. Phys. Rev. Lett. 54, 693 (1985).
Ref. 3: D. Strickland et al., Opt. Comm. 56, 219 (1985).
Ref. 4: E. Esarey et al., Rev. Mod. Phys. 81, 1229 (2009).
Ref. 5: G. Mourou et al., Eur. Phys. J. Sp. Top. 223, 1113 (2014).
Ref. 5a: T. Tajima, Eur. Phys. J. Sp. Top. 223, 1037 (2014).
Ref. 5b: N. V. Myung, et al. Nanotech. 15, 833 (2004).
Ref. 5c: S. Iijima, Nature 354, 56 (1991).
Ref. 6: T. Tajima, Proc. Jpn. Acad. Ser. B 86, 147 (2010).
Ref. 7: N. Naumova et al., PRL 93, 195003 (2004).
Ref. 8: K. Nakajima, et al. PR STAB 14, 091301 (2011).
Ref. 9: A. Deng et al., PR STAB 15, 081303 (2012).
Ref. 10: Newberger, B. et al., Application of Novel Material in Crystal Accelerator Concepts, Proc. IEEE Part. Acc. (IEEE, Chicago, 1989) p. 630.
Ref. 11: G. Mourou et al., Rev. Mod. Phys. 78, 309 (2006).
Ref. 12: F. L. Zheng et al., Phys. Plasmas 19, 023111(2012); F. L. Zheng, et al. Phys. Plasmas 20, 013107 (2013).
Ref. 13: Esirkepov, T. et al., Phys. Rev. Lett. 92, 175003 (2004).
Ref. 14: Terranova, F. et al., Nuclear Phys. B-Proceedings Supplements 143, 572 (2005).
Ref. 15: "Nuclear Physics and Gamma-ray Sources for Nuclear Security and Nonproliferation" (Tokai, Japan, 2014) www.jaca.go.jp/english/npnsnp/NPNSNP%20Programy
Ref. 16: J. Koga et al., in Ultrafast Optics V (2007).
Ref. 17: A. Di Piazza et al., Rev. Mod. Phys. 84, 1177 (2012).
Ref. 18: S. Corde, et al., et al. Rev. Mod. Phys. 85, 1 (2013).
Ref. 19: Y. Ma et al., submitted to Nature Photon. (2014).
Ref. 20: Tajima, T et al., J. Phys. Soc. Jpn, 69, 3840 (2000).
Ref. 21: T. Tajima, Laser Part. Beams 3, 351 (1985).
Ref. 22: T. Tajima et al., Phys. Rev. Lett. 59, 1440 (1987).

What is claimed is:

1. A method of laser wakefield acceleration in a solid media regime comprising the steps of injecting an X-ray pulse into a solid medium with one or more nanoholes there through, and accelerating particles in the solid medium through wakefield acceleration.

2. The method of claim 1 wherein the solid medium is a metallic plasma.

3. The method of claim 1 wherein the solid medium is a crystal.

4. The method of claim 1 wherein the X-ray pulse is a compressed coherent high intensity X-ray pulse.

5. The method of claim 4 further comprising the step of generating the compressed X-ray pulse from a compressed optical laser pulse, wherein the compressed X-ray pulse has an intensity 1 to 3 orders of magnitude greater than an intensity of the optical laser pulse and a pulse duration 1 to 3 orders of magnitude smaller than a pulse duration of the optical laser.

6. The method of claim 5 wherein the step of generating the compressed X-ray pulse includes pulse compressing the compressed optical laser.

7. The method of claim 6 further comprising the step of generating the compressed optical laser.

8. The method of claim 7 wherein the pulse duration of the compressed optical laser is in the $10^0$ fs scale.

9. The method of claim 8 wherein the pulse duration of the compressed X-ray pulse is in the $10^0$ as scale.

10. A method of laser wakefield proton acceleration in a solid media regime comprising the steps of injecting protons into a solid medium, injecting an X-ray pulse into the solid medium with one or more nanoholes there through, and accelerating the protons in the solid medium through wakefield acceleration.

11. The method of claim 10 wherein the solid medium is a metallic plasma.

12. The method of claim 10 wherein the solid medium is a crystal.

13. The method of claim 10 wherein the protons are injected from a thin foil.

14. The method of claim 13 wherein the X-ray pulse is a compressed coherent high intensity X-ray pulse generated from a compressed optical laser pulse.

15. The method of claim 14 further comprising the steps of illuminating the thin foil with the compressed X-ray pulse and then illuminating the solid medium with the compressed X-ray pulse generating a metallic plasma wave that accelerates the protons.

16. The method of claim 14 further comprising the steps of illuminating the thin foil with the compressed optical laser pulse and then illuminating the solid medium with the compressed X-ray pulse generating a metallic plasma wave that accelerates the protons.

17. The method of claim 16 further comprising the step of generating the compressed X-ray pulse from a compressed optical laser pulse, wherein the compressed X-ray pulse has an intensity 1 to 3 orders of magnitude greater than an intensity of the optical laser pulse and a pulse duration 1 to 3 orders of magnitude smaller than a pulse duration of the optical laser.

18. The method of claim 17 wherein the step of generating the compressed X-ray pulse includes pulse compressing the compressed optical laser.

19. The method of claim 18 further comprising the step of generating the compressed optical laser.

20. The method of claim 19 wherein the pulse duration of the compressed optical laser is in the $10^0$ fs scale.

21. The method of claim 20 wherein the pulse duration of the compressed X-ray pulse is in the $10^0$ as scale.

22. The method of claim 17 wherein the pulse duration of the compressed optical laser is in the $10^0$ fs scale.

23. The method of claim 22 wherein the pulse duration of the compressed X-ray pulse is in the $10^0$ as scale.

* * * * *